(12) United States Patent
Li et al.

(10) Patent No.: US 11,588,962 B2
(45) Date of Patent: Feb. 21, 2023

(54) FLEXIBLE SCREEN MODULE, TERMINAL DEVICE AND PHOTOGRAPHING METHOD

(71) Applicant: Beijing Xiaomi Mobile Software Co., Ltd., Beijing (CN)

(72) Inventors: Peng Li, Beijing (CN); Xuwang Cui, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 181 days.

(21) Appl. No.: 16/798,912

(22) Filed: Feb. 24, 2020

(65) Prior Publication Data

US 2021/0160410 A1 May 27, 2021

(51) Int. Cl.
*H04N 5/225* (2006.01)
*G06F 1/16* (2006.01)

(52) U.S. Cl.
CPC ......... *H04N 5/2257* (2013.01); *G06F 1/1652* (2013.01); *H04N 5/2259* (2013.01); *H04N 5/225251* (2018.08)

(58) Field of Classification Search
CPC ...... G09F 9/30; G06F 1/1652; H04M 1/0264; H04M 1/0268; H04N 5/2251; H04N 5/2252; H04N 5/22525; H04N 5/225251; H04N 5/2257; H04N 5/2259; H04N 5/23299; H04N 5/23293–232945; G03B 30/00
See application file for complete search history.

(56) References Cited

U.S. PATENT DOCUMENTS

| 2009/0270142 | A1 | 10/2009 | Liang | |
|---|---|---|---|---|
| 2015/0248144 | A1* | 9/2015 | Hong | .............. G06F 1/3265 361/679.27 |
| 2019/0361502 | A1* | 11/2019 | Bai | .............. G06F 1/1616 |
| 2020/0044003 | A1 | 2/2020 | Cho et al. | |
| 2021/0343688 | A1* | 11/2021 | Li | ............ H04N 5/2257 |
| 2022/0253103 | A1* | 8/2022 | Choi | ............ H04M 1/0237 |

FOREIGN PATENT DOCUMENTS

| CN | 1744623 A | 3/2006 |
|---|---|---|
| CN | 104537955 A | 4/2015 |
| CN | 105554193 A | 5/2016 |
| CN | 107948360 A | 4/2018 |

(Continued)

OTHER PUBLICATIONS

Supplementary European Search Report in the European Application No. 20162224.8, dated Sep. 29, 2020.

(Continued)

*Primary Examiner* — Paul M Berardesca
(74) *Attorney, Agent, or Firm* — Finnegan, Henderson, Farabow, Garrett & Dunner, L.L.P.

(57) ABSTRACT

A flexible screen module includes: a flexible screen, a camera component, and a driving component; wherein the flexible screen includes a first display area and a second display area, and the second display area comprises a sub-area, the camera component is provided in the sub-area of the second display area, and the driving component is configured to drive the flexible screen and the camera component to move synchronously to enable the second display area to be switched between a first position and a second position.

16 Claims, 8 Drawing Sheets

(56) References Cited

FOREIGN PATENT DOCUMENTS

| | | | |
|---|---|---|---|
| CN | 108184057 A | 6/2018 | |
| CN | 108289171 A | 7/2018 | |
| CN | 108377279 A | 8/2018 | |
| CN | 108616624 A | 10/2018 | |
| CN | 108833618 A | 11/2018 | |
| CN | 108924296 A * | 11/2018 | ............ H04M 1/026 |
| CN | 108924296 A | 11/2018 | |
| CN | 208094613 U | 11/2018 | |
| CN | 208445604 U | 1/2019 | |
| CN | 109388270 A * | 2/2019 | |
| CN | 208956111 U | 6/2019 | |
| CN | 209017095 U | 6/2019 | |
| CN | 109995917 A | 7/2019 | |
| CN | 110286721 A * | 9/2019 | |
| CN | 110286807 A * | 9/2019 | |
| CN | 110290235 A | 9/2019 | |
| CN | 110300195 A | 10/2019 | |
| CN | 110445898 A | 11/2019 | |
| CN | 110445899 A | 11/2019 | |
| CN | 110460690 A | 11/2019 | |
| CN | 110475001 A | 11/2019 | |
| JP | 2002223275 A | 8/2002 | |
| JP | 2013141158 A | 7/2013 | |
| JP | 2019148629 A | 9/2019 | |
| KR | 20170015089 A | 2/2017 | |
| KR | 101992518 B1 | 6/2019 | |
| KR | 20190119719 A | 10/2019 | |
| WO | WO 2014119829 A1 | 8/2014 | |
| WO | WO 2016/182503 A1 | 11/2016 | |
| WO | WO 2018174459 A1 | 9/2018 | |

OTHER PUBLICATIONS

First Office Action of Chinese Application No. 201911155453.0, dated Jul. 13, 2021.
Notification of Reason for Refusal of Korean Application No. 10-2020-7007529, dated Jul. 19, 2021.
English version of International Search Report in International Application No. PCT/CN2020/074234, dated Jul. 24, 2020.
Notice of Reasons for Refusal dated Feb. 22, 2022, from the Japanese Patent Office issued in counterpart Japanese Application No. 2020-514516.
Decision of Refusal of Japanese Application No. 2020-514516, dated Aug. 16, 2022.
Examination Report of Indian Application No. 202047012841, dated Sep. 30, 2022.

* cited by examiner

FLEXIBLE SCREEN MODULE, TERMINAL DEVICE AND PHOTOGRAPHING METHOD

CROSS-REFERENCE TO RELATED APPLICATION

This application is based upon and claims priority to Chinese Patent Application No. 201911155453.0 filed on Nov. 22, 2019, the entire content of which is incorporated herein by reference.

TECHNICAL FIELD

The disclosure relates to the field of electronic technology, and more particularly, to a flexible screen module, a terminal device and a photographing method.

BACKGROUND

With the generation update of terminal devices, full screen is becoming an important development trend, but there are still many factors restricting the development of full screen. Taking a mobile phone as an example, components such as a front camera, a receiver and a sensor that occupy the area of the screen are usually integrated on the front side of the mobile phone. With the development of electronic technology, the influence from components such as the receiver and the sensor can be avoided by miniaturization or use of under-screen technology. However, in order to guarantee the imaging effect, it may be difficult to reduce the size of the front camera.

SUMMARY

The disclosure provides a flexible screen module with an improved screen-to-body ratio, a terminal device and a photographing method.

According to a first aspect of the disclosure, a flexible screen module includes a flexible screen, a camera component, and a driving component, wherein the flexible screen includes a first display area and a second display area, and the second display area includes a sub-area; the camera component is provided in the sub-area of the second display area; and the driving component is configured to drive the flexible screen and the camera component to move synchronously to enable the second display area to be switched between a first position and a second position. When the second display area is in the first position, the first display area serves as a front display area, the second display area serves as a back display area, and the camera component is configured to acquire an image in back of the flexible screen module. When the second display area is in the second position, the sub-area of the second display area serves as a part of the front display area, the camera component is configured to acquire an image in front of the flexible screen module.

According to a second aspect of the disclosure, a terminal device includes a body and the flexible screen module. The flexible screen surrounds the body. When the second display area is in the first position, the sub-area of the second display area is located in back of the body, and the camera component is configured to acquire an image in back of the body; and when the second display area is in the second position, the sub-area of the second display area is at least partially located in front of the body, and the camera component is configured to acquire an image in front of the body.

According to a third aspect of the disclosure, a photographing method applied to the terminal device, includes: acquiring a front photographing instruction from a user; driving the flexible screen and the camera component through the driving component to move synchronously to enable the second display area to be switched from the first position to the second position; and performing front photographing through the camera component.

When front photographing is not needed, the first display area may serve as the front display area, a screen-to-body ratio may be close to 100% and a real full screen can be realized. When front photographing is needed, the driving component can drive the camera component to move synchronously with the flexible screen, so that the sub-area of the second display area can be used for front displaying and the camera component can realize front photographing.

DETAILED DESCRIPTION

Description will now be made in detail to exemplary embodiments, examples of which are illustrated in the accompanying drawings. When the accompanying drawings are involved in the following description, unless otherwise indicated, the same numbers in different drawings represent the same or similar elements. The embodiments described in the following description do not represent all embodiments consistent with the disclosure. Instead, they are merely examples of apparatuses and methods consistent with aspects related to the disclosure as recited in the appended claims.

Terms used in the disclosure are for describing specific embodiments only and are not intended to limit the disclosure. The terms "first," "second," and similar words used in the disclosure do not indicate any order, quantity or importance, but are only used to distinguish different components. Unless otherwise represented, the terms "front" and "rear" are used for illustrative purpose only and may not be limited to a location or a spatial orientation. The terms "connect" or "connected" are not limited to physical or mechanical connections, and may include electrical connections, whether direct or indirect.

Embodiments of the present disclosure provide a flexible screen module, which may include a flexible screen, a camera component and a driving component. The flexible screen may include a first display area, a second display area, and a third display area. The third display area may be connected with the first display area and the second display area, and the second display area may include a sub-area. The camera component may be provided in the sub-area of the second display area. The driving component may be configured to drive the flexible screen and the camera component to move synchronously to enable the second display area to be switched between a first position and a second position. When the second display area is in the first position, the first display area serves as a front display area, the second display area may serve as a back display area, and the camera component may be configured to acquire an image in back of the flexible screen module. When the second display area is in the second position, the sub-area of the second display area may serve as a part of the front display area, and the camera component may be configured to acquire an image in front of the flexible screen module.

Figure 1:
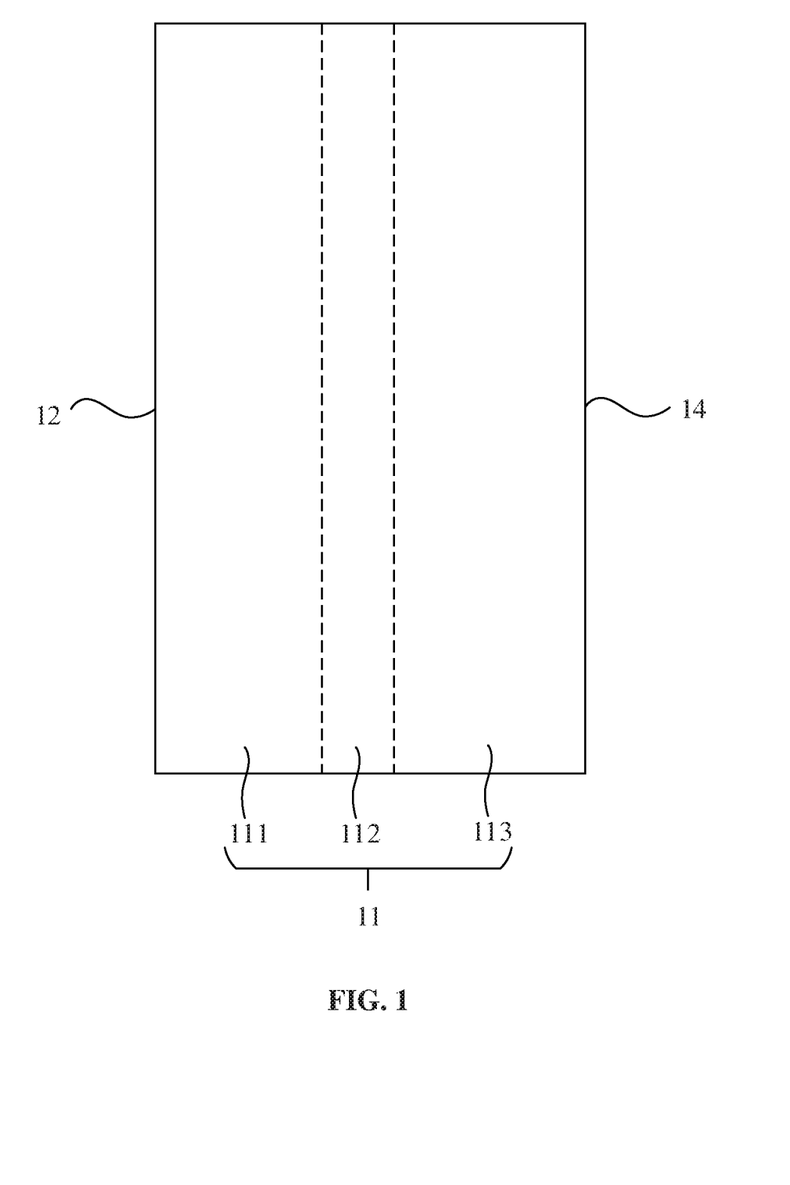
FIG. 1 is a front schematic view of a flexible screen module according to an embodiment.
Figure 2:
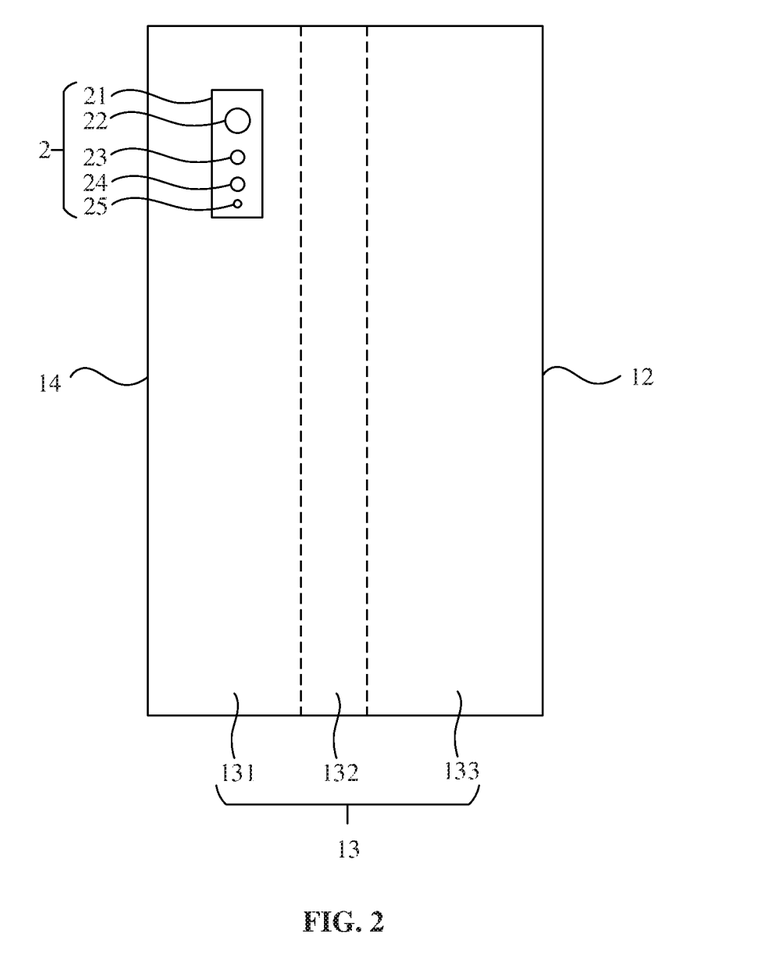
FIG. 2 is a rear schematic view of the flexible screen module illustrated in FIG. 1, according to an embodiment.
Figure 3:
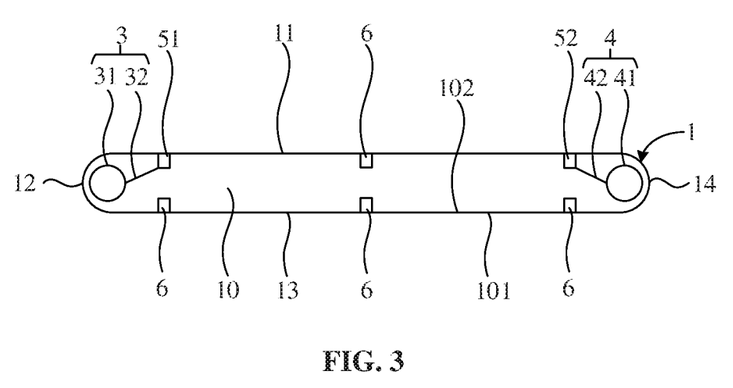
FIG. 3 is a side schematic view of the flexible screen module illustrated in FIG. 1, according to an embodiment.

FIGS. 1, 2, and 3 are front, rear, and side schematic views of a flexible screen module according to an embodiment. Referring to FIGS. 1, 2, and 3, the flexible screen module may include a flexible screen 1, a camera component 2 and a driving component. The driving component may be configured to drive the flexible screen 1 and the camera component 2 to move synchronously, so as to adjust a position of the camera component 2 to acquire images in front and back of the flexible screen module. The side, facing to the user, of the flexible screen module may be the front, and the side opposite to the user may be the back.

The flexible screen 1 may be ring-shaped and may include a first display area 11, a third display area 14, a second display area 13 and a fourth display area 12 which are sequentially connected. The flexible screen 1 may surround the driving component, and the driving component may be located in a space formed by the flexible screen 1. The first display area 11 may include a first sub-area 111, a second sub-area 112 and a third sub-area 113. The second display area 13 may include a fourth sub-area 131, a fifth sub-area 132 and a sixth sub-area 133, i.e., the fourth sub-area 131, the fifth sub-area 132 and the sixth sub-area 133 may be all sub-areas of the second display area 13. It is to be noted that the sub-areas of each display area may be integral, and the sub-areas may be divided from the first display area and the second display area for illustrative purposes. The camera component 2 may be provided in the fourth sub-area 131, so that the projection of the camera component 2 in the second display area may be located in the fourth sub-area 131. The driving component may drive the flexible screen 1 and the camera component 2 to move synchronously to enable the second display area 13 to be switched between a first position and a second position.

Referring to FIG. 1 and FIG. 2, when the second display area 13 is in the first position, the first display area 11 may face to the second display area 13, and the third display area 14 may face to the fourth display area 12. The first display area 11 may serve as a front display area facing to a user (equivalent to the display area of a normal mobile phone), the third display area 14 and the fourth display area 12 may serve as side display areas, and the second display area 13 may serve as a back display area. In such a case, the camera component 2 may face to the rear of the flexible screen module to acquire an image in back of the flexible screen. Since the first display area 11 does not need to be provided with a camera or other sensors, a screen-to-body ratio can be close to 100% and a real full screen is realized.

Figure 4:
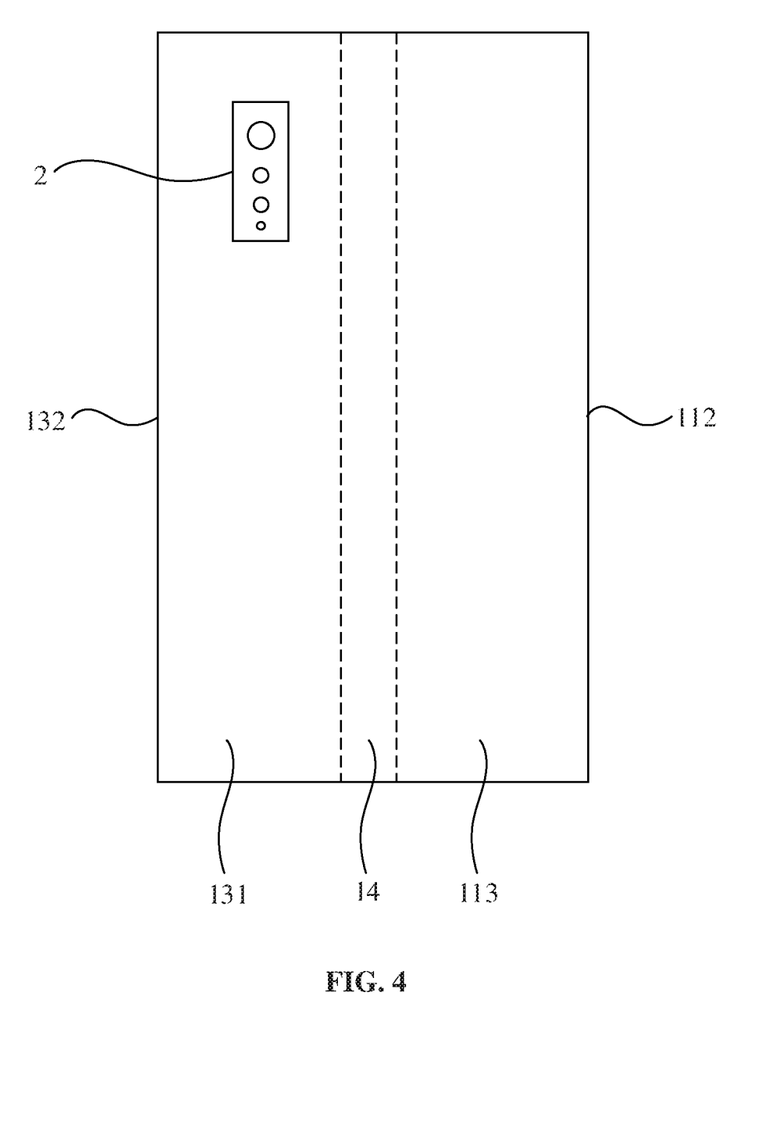
FIG. 4 is a front schematic view of the flexible screen module illustrated in FIG. 1, according to an embodiment.
Figure 5:
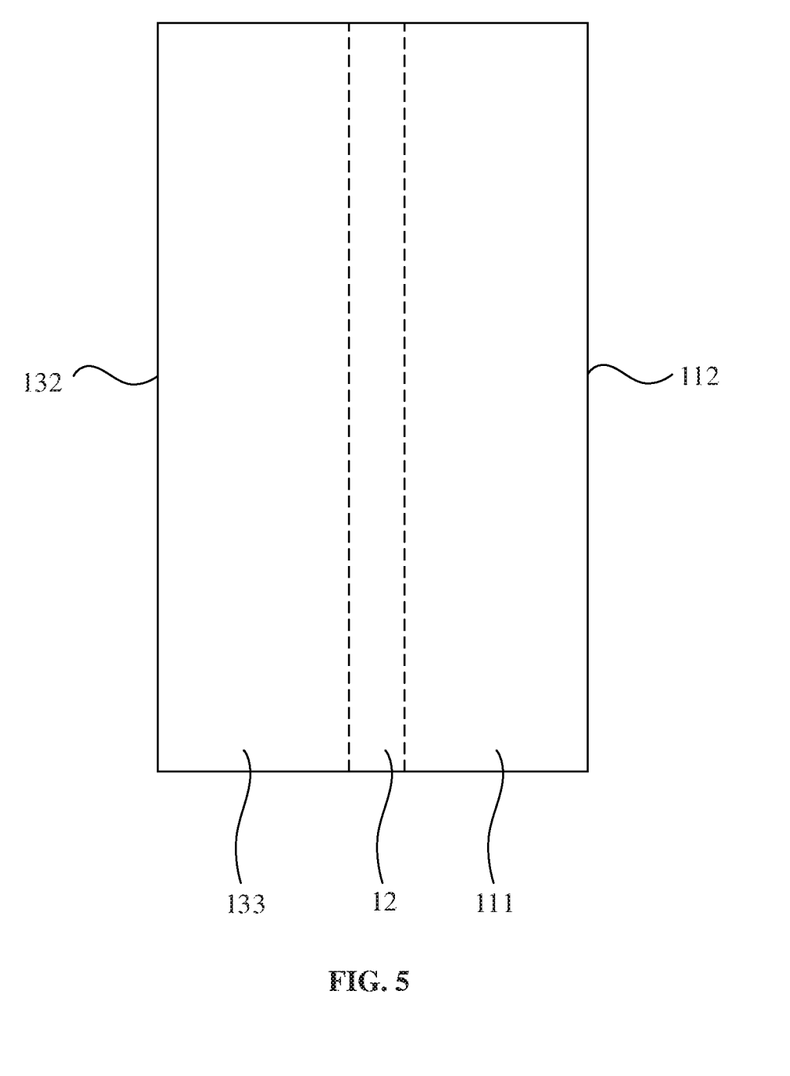
FIG. 5 is a rear schematic view of the flexible screen module illustrated in FIG. 4, according to an embodiment.

FIGS. 4 and 5 are front and rear schematic views of the flexible screen module according to an embodiment. Referring to FIG. 4 and FIG. 5, when the second display area 13 is in the second position, the fourth sub-area 131, the third display area 14 and the third sub-area 113 may be coplanar and may serve as the front display area facing to a user, the second sub-area 112 and the fifth sub-area 132 may respectively serve as two side display areas, the first sub-area 111, the fourth display area 12 and the sixth sub-area 133 may be coplanar and may serve as the back display area. In other words, in such a case, the second display area 13 and the first display area 11 may be both parts of the front display area and the back display area and may both serve as the side display areas, so that the second display area 13 and the first display area 11 may both have a rightwards-opened square shape. Since the camera component 2 is provided in the fourth sub-area 131 of the second display area 13, the camera component 2 may face to the front of the flexible screen module and may be configured to acquire an image in front of the flexible screen.

In an embodiment, when the second display area 13 is in the second position, the second display area 13 may serve as the front display area, and the first display area 11 may serve as the back display area, i.e., the movement of the flexible screen may cause the positions of the second display area 13 and the first display area 11 to be interchanged and cause the positions of the third display area 14 and the four display areas 12 to be interchanged. In any cases, the fourth sub-area 131 may be part of the front display area.

In the embodiment, when front photographing is not used, the camera component 2 may face to the rear of the flexible screen module without occupying the front display area, so that the front display area is full of the entire terminal device as much as possible, and a screen-to-body ratio can be close to 100%; when front photographing is needed, the camera component 2 may face to the front of the flexible screen module, and since the rear camera is shared, the imaging effect of the acquired image can be better than the imaging effect of the image acquired by the conventional front camera.

In some embodiments, the third display area 14 and the fourth display area 12 may not be provided, the first display area 11 and the second display area 13 may be connected by two flexible film structures, and the parameters such as the thickness and flexibility of the flexible film structures may be equivalent to those of the flexible screen. In some embodiments, the fourth display area 12 may not be provided, and the size of the second display area 13 may be reduced. For example, the second display area 13 may only include the fourth sub area 131, and a screen-to-body ratio of 100% and a better front imaging effect can also be realized by using one flexible film structure to replace the fourth display area. Since the size of the flexible screen is reduced, the cost can be reduced.

Referring back to FIG. 2 and FIG. 3, the camera component 2 may include a body 21, and a first camera 22, a second camera 23, a third camera 24 and a sensor 25 which are mounted on the body 21. The first camera 22, the second camera 23 and the third camera 24 may respectively correspond to a main camera, a wide-angle camera and a depth-of-field camera. The sensor 25 may be an ambient light sensor, a proximity sensor, an infrared sensor or the like. The orientation of the camera component 2 may be understood as the orientation of the camera and the sensor. In other embodiments, the number of cameras and the number of sensors may be increased or decreased adaptively.

The driving component may include a first driving component 3. In the embodiment, the first driving component 3 may be provided in a space 10 formed by the flexible screen and may be adjacent to the fourth display area 12. The first driving component 3 may include a first power unit 31 and a first transmission unit 32. The flexible screen module may further include a first stress unit 51 connected with the flexible screen 1, and the first transmission unit 32 may be configured to transmit the power of the first power unit 31 to the first stress unit 51 to drive the flexible screen 1 to move. The first stress unit 51 may be flexible and may be deformed with the flexible screen 1 while the flexible screen 1 is deformed. In some embodiments, the first power unit 31 may be a motor, the first transmission unit may be a gear, the first stress unit 51 may be a steel sheet, and the steel sheet may be provided with meshing teeth matched with the gear. In other embodiments, the first stress unit 51 may be a gear rack, and the gear and the gear rack may cooperate with each other to drive the flexible screen.

In an embodiment, the driving component may further include a third driving component 4. The third driving component 4 may be provided in the space 10 and may be adjacent to the third display area 14. In an embodiment, the first driving component 3 and the third driving component 4 may be symmetrically provided in the space 10, so as to improve the stability of driving, and the two driving components may also prevent the service life of the flexible screen from being influenced due to excessive stress. The third driving component 4 may include a third power unit 41 and a third transmission unit 42. The flexible screen module may further include a second stress unit 52 connected with the flexible screen 1. The third transmission unit 42 may be configured to transmit the power of the third power unit 41 to the second stress unit 52. The structures of the third driving component 4 and the second stress unit 52 may be similar to those of the first driving component 3 and the first stress unit 51 respectively, which will not be described herein in detail.

The flexible screen 1 may be provided with a display surface 101 and a non-display surface 102, i.e., a ring-shaped outer surface and inner surface. The display surface 101 may surround the non-display surface 102, and the first stress unit 51 and the second stress unit 52 may be fixed on the non-display surface of the flexible screen.

The movement of the flexible screen 1 may be similar to that of a caterpillar track of an engineering vehicle, and the difference is that the movement of the flexible screen does not produce displacement. For example, the flexible screen 1 may be provided with a center line. Taking that the second display area 13 is in the first position as an example, the center line may be the intersecting line of the bisection plane of the first display area 11 and the bisection plane of the third display area 14. The driving component may drive the flexible screen to move around the center line.

In an embodiment, the flexible screen module may further include a support unit 6. The support unit 6, the first stress unit 51 and the second stress unit 52 may jointly support the flexible screen 1 to prevent the flexible screen 1 from being collapsed and avoid the display effect from being influenced. The support unit 6 may be deformed as well while the flexible screen 1 is deformed. In some embodiments, a plurality of support units may be arranged, which, together with the first stress unit 51 and the second stress unit 52, may be uniformly distributed in the space 10 of the flexible screen 1.

Figure 6:
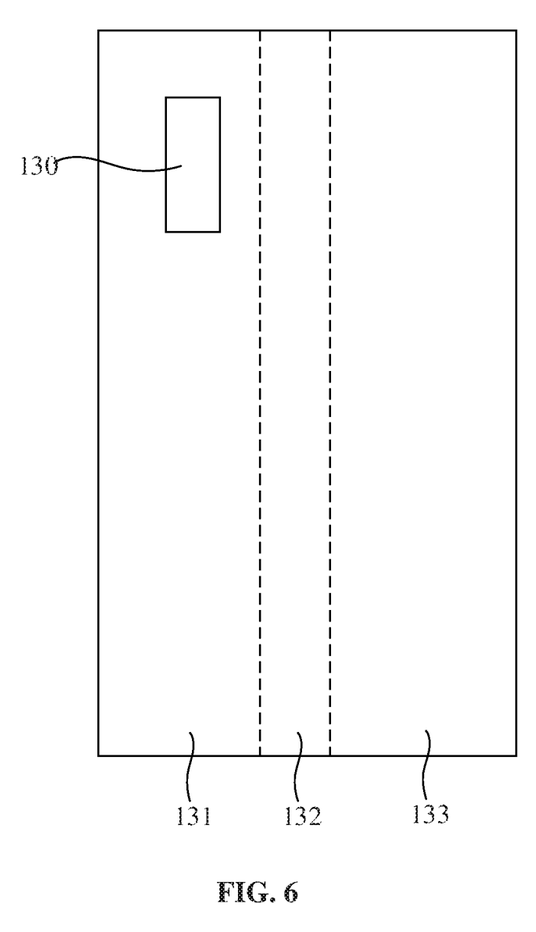
FIG. 6 is a rear schematic view of a flexible screen of a flexible screen module according to an embodiment.

FIG. 6 is a rear schematic view of a flexible screen of a flexible screen module according to an embodiment. In the embodiment, the second display area 13 may include an opening 130, and the camera component 2 may be provided in the opening 130. Since there is no occlusion, the camera component 2 can acquire images directly. In an embodiment, the second display area 13 may cover the camera component 2, and the camera component 2 may acquire images through the second display area 13. No matter where the camera component 2 is arranged, the camera component 2 can be fixed with the fixed flexible screen, and the first driving component 3 (FIG. 3) may drive both of them to move synchronously.

Figure 7:
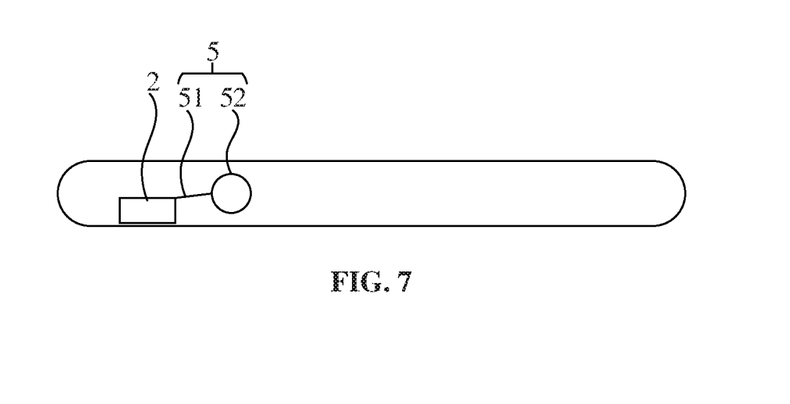
FIG. 7 is a side schematic view of a flexible screen module according to an embodiment.

FIG. 7 is a side schematic view of a flexible screen module according to an embodiment. In the embodiment, the camera component 2 may be provided separately from the flexible screen 1. The driving component may include a second driving component and the first driving component 3 (not shown in FIG. 7), the first driving component 3 may be configured to drive the flexible screen 1, and the second driving component may be configured to drive the camera component 2 to move synchronously with the flexible screen. In some embodiments, the second driving component may include a second power unit and a second transmission unit. The second power unit may be a motor, and the second transmission unit may be a retractable linkage rod.

It is to be noted that when the third driving component 4 (FIG. 3) and the first driving component 3 (FIG. 3) or the second driving component are provided on the same side of the space 10 of the flexible screen, position avoidance may need to be adopted between the third driving component 4 and the first driving component 3 or the second driving component 7 to avoid interference between them.

Figure 8:
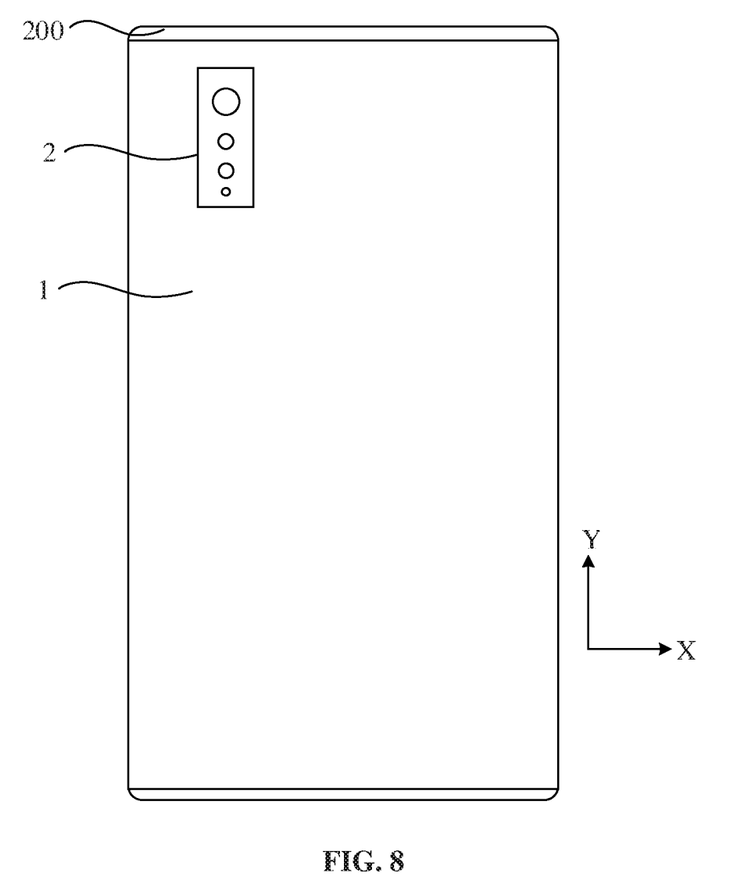
FIG. 8 is a front schematic view of a terminal device according to an embodiment.
Figure 9:
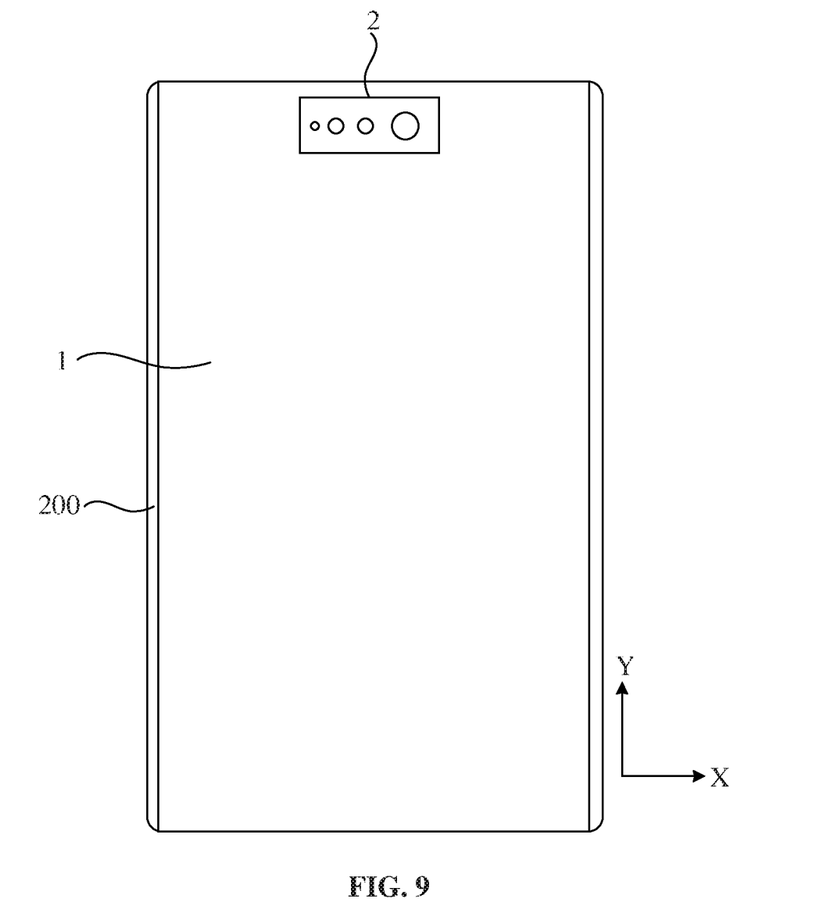
FIG. 9 is a front schematic view of a terminal device according to an embodiment.

FIGS. 8 and 9 are front schematic views of a terminal device according to some embodiments. Referring to FIGS. 8 and 9, the terminal device includes a body 200 and the flexible screen module described above. The flexible screen 1 may surround the body 200. When the second display area 13 (not shown) is in a first position, the second display area 13 may be located in back of the body 200, and the camera component 2 may be configured to acquire an image in back of the body. When the second display area 13 is in a second position, the fourth sub-area 131 (not shown) may be located in front of the body 200, and the camera component 2 may be configured to acquire an image in front of the body 200. First and second ends of the body 200 may protrude out of the flexible screen 1. In the process of switching the position of the second display area 13, a user may hold the first and second ends of the body to prevent from affecting the movement of the flexible screen.

It is to be noted that the first and second ends herein may be the two ends in the length direction or the width direction. In one embodiment, in the process of switching the second display area 13 between the first position and the second position, the movement direction of the flexible screen 1 may be always perpendicular to the length direction Y of the body 200, the two ends of the length direction of the body 200 may protrude out of the flexible screen, and the cameras of the camera component 2 may be arranged along the length direction Y, as illustrated in FIG. 8. In another embodiment, in the process of switching the second display area 13 between the first position and the second position, the movement direction of the second display area may be always perpendicular to the width direction X of the body 200, and the two ends of the width direction of the body 200 may protrude out of the flexible screen, and the cameras of the camera component 2 may be arranged along the width direction X, as illustrated in FIG. 9.

The body 200 may further include a housing. Components such as a main board, a processor, a memory and a battery may be mounted in the housing. The camera component 2 may be electrically connected with the main board through a flexible cable or a flexible circuit board for data transmission. In some embodiments, the camera component 2 may also be communicatively connected with the main board through a wireless module, such as a Bluetooth module or a WIFI module.

Embodiments of the disclosure also provide a photographing method for the terminal device described above. The photographing method may include:

step S1: acquiring a front photographing instruction from a user;

step S2: driving the flexible screen and the camera component through the driving component to move synchronously to enable the second display area to be switched from the first position to the second position; and step S3: performing front photographing through the camera component.

In the embodiment, when front photographing is not used, the first display area may serve as the front display area, a screen-to-body ratio can be close to 100% and a real full screen can be realized; and when front photographing is needed, the driving component can drive the camera component to move synchronously with the flexible screen, so that the sub-area of the second display area may be used for front display, and in such a case the camera component can realize front photographing.

Other embodiments of the disclosure will be apparent to those skilled in the art from consideration of the specification and practice of the disclosure disclosed here. The disclosure is intended to cover any variations, uses, or adaptations of the disclosure following the general principles thereof and including such departures from the disclosure as come within known or customary practice in the art. It is intended that the embodiments be considered as exemplary only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A flexible screen module, comprising:
a flexible screen, a camera component, a driving component, a stress unit, and at least one support unit different from the stress unit;
wherein the flexible screen is ring-shaped and comprises a first display area and a second display area, and the second display area comprises a sub-area,
the camera component is provided in the sub-area of the second display area,
the driving component is configured to drive the flexible screen and the camera component to move synchronously to enable the second display area to be switched between a first position and a second position;
when the second display area is in the first position, the first display area serves as a front display area, the second display area serves as a back display area, and the camera component is configured to acquire an image in back of the flexible screen module; and
when the second display area is in the second position, the sub-area of the second display area serves as a part of the front display area, and the camera component is configured to acquire an image in front of the flexible screen module; and
wherein the flexible screen is provided with a display surface and a non-display surface,
the display surface surrounds the non-display surface, and the stress unit is fixed on the non-display surface of the flexible screen,
the driving component comprises a power unit and a transmission unit, and
the power unit is configured to drive the stress unit and the flexible screen through the transmission unit,
wherein the support unit is fixed on the non-display surface of the flexible screen, and the support unit and the stress unit are configured to jointly support the flexible screen.

2. The flexible screen module of claim 1, wherein the sub-area of the second display area covers the camera component, and the camera component is configured to acquire an image through the sub-area of the second display area.

3. The flexible screen module of claim 1, wherein the sub-area of the second display area is provided with an opening, and the camera component is at least partially located in the opening.

4. The flexible screen module of claim 2, wherein the driving component comprises a first driving component and a second driving component, the first driving component is configured to drive the flexible screen, and the second driving component is configured to drive the camera component to move synchronously with the flexible screen.

5. The flexible screen module of claim 1, wherein:
the flexible screen comprises a third display area and a fourth display area;
the first display area, the third display area, the second display area and the fourth display area are in sequential connection to form a ring; and
when the second display area is in the first position, the first display area faces to the second display area and the third display area faces to the fourth display area.

6. The flexible screen module of claim 5, wherein the flexible screen is provided with a center line, and the driving component is configured to drive the flexible screen to move around the center line.

7. The flexible screen module of claim 1, wherein the stress unit and the support unit are flexible, and the stress unit and the support unit are configured to be deformed when the flexible screen is deformed.

8. A terminal device, comprising:
a flexible screen module, wherein the flexible screen module comprises a flexible screen, a camera component, a driving component, a stress unit, and at least one support unit different from the stress unit;
wherein the flexible screen is ring-shaped and comprises a first display area and a second display area, and the second display area comprises a sub-area,
the camera component is provided in the sub-area of the second display area,
the driving component is configured to drive the flexible screen and the camera component to move synchronously to enable the second display area to be switched between a first position and a second position;
when the second display area is in the first position, the first display area serves as a front display area, the second display area serves as a back display area, and the camera component is configured to acquire an image in back of the flexible screen module; and
when the second display area is in the second position, the sub-area of the second display area serves as a part of the front display area, and the camera component is configured to acquire an image in front of the flexible screen module; and wherein the flexible screen is provided with a display surface and a non-display surface, the display surface surrounds the non-display surface, and the stress unit is fixed on the non-display surface of the flexible screen, the driving component comprises a power unit and a transmission unit, and the power unit is configured to drive the stress unit and the flexible screen through the transmission unit, wherein the support unit is fixed on the non-display surface of the flexible screen, and the support unit and the stress unit are configured to jointly support the flexible screen.

9. The terminal device of claim 8, further comprising a body, wherein:

the flexible screen module surrounds the body, when the second display area is in the first position, the sub-area of the second display area is located in back of the body, and the camera component is configured to acquire an image in back of the body; and when the second display area is in the second position, the sub-area of the second display area is at least partially located in front of the body, and the camera component is configured to acquire an image in front of the body.

10. The terminal device of claim 9, wherein a movement direction of the flexible screen is perpendicular to one of a length direction of the body or a width direction of the body.

11. The terminal device of claim 9, wherein the sub-area of the second display area is provided with an opening, and the camera component is at least partially located in the opening.

12. The terminal device of claim 11, wherein the driving component comprises a first driving component and a second driving component, the first driving component is configured to drive the flexible screen, and the second driving component is configured to drive the camera component to move synchronously with the flexible screen.

13. The terminal device of claim 9, wherein:

the flexible screen comprises a third display area and a fourth display area;

the first display area, the third display area, the second display area and the fourth display area are in sequential connection to form a ring; and when the second display area is in the first position, the first display area faces to the second display area and the third display area faces to the fourth display area.

14. The terminal device of claim 13, wherein the flexible screen is provided with a center line, and the driving component is configured to drive the flexible screen to move around the center line.

15. The terminal device of claim 8, wherein the stress unit and the support unit are flexible, and the stress unit and the support unit are configured to be deformed when the flexible screen is deformed.

16. A photographing method, applied to a terminal device comprising a flexible screen module, the flexible screen module comprising a flexible screen, a camera component, a driving component, a stress unit, and at least one support unit different from the stress unit, wherein the flexible screen is ring-shaped and comprises a first display area and a second display area, the second display area comprises a sub-area, the camera component is provided in the sub-area of the second display area, the driving component is configured to drive the flexible screen and the camera component to move synchronously to enable the second display area to be switched between a first position and a second position; when the second display area is in the first position, the first display area serves as a front display area, the second display area serves as a back display area, and the camera component is configured to acquire an image in back of the flexible screen module; and when the second display area is in the second position, the sub-area of the second display area serves as a part of the front display area, and the camera component is configured to acquire an image in front of the flexible screen module, and wherein the flexible screen is provided with a display surface and a non-display surface, the display surface surrounds the non-display surface, the stress unit is fixed on the non-display surface of the flexible screen, the driving component comprises a power unit and a transmission unit, and the power unit is configured to drive the stress unit and the flexible screen through the transmission unit, wherein the support unit is fixed on the non-display surface of the flexible screen, and the support unit and the stress unit are configured to jointly support the flexible screen, the photographing method comprising:

acquiring a front photographing instruction from a user;

driving the flexible screen and the camera component through the driving component to move synchronously to enable the second display area to be switched from the first position to the second position; and performing front photographing through the camera component.

\* \* \* \* \*

UNITED STATES PATENT AND TRADEMARK OFFICE
CERTIFICATE OF CORRECTION

| | |
|---|---|
| PATENT NO. | : 11,588,962 B2 |
| APPLICATION NO. | : 16/798912 |
| DATED | : February 21, 2023 |
| INVENTOR(S) | : Peng Li et al. |

It is certified that error appears in the above-identified patent and that said Letters Patent is hereby corrected as shown below:

On the Title Page

Item (30), please add:
"Foreign Application Priority Data,
CN 2019111554530 filed November 22, 2019"

Signed and Sealed this
Thirty-first Day of October, 2023

Katherine Kelly Vidal
*Director of the United States Patent and Trademark Office*